(12) United States Patent
Nemcek et al.

(10) Patent No.: US 7,823,652 B2
(45) Date of Patent: Nov. 2, 2010

(54) PORTABLE TOOL WITH A HAND-GRIPPED CONTROLLER AND METHOD OF USING A PORTABLE POWERED TOOL

(75) Inventors: Andrew Nemcek, Elgin, IL (US); Ronald Carlson, Elgin, IL (US)

(73) Assignee: Echo, Inc., Lake Zurich, IL (US)

( * ) Notice: Subject to any disclaimer, the term of this patent is extended or adjusted under 35 U.S.C. 154(b) by 122 days.

(21) Appl. No.: 12/228,705

(22) Filed: Aug. 14, 2008

(65) Prior Publication Data

US 2010/0038106 A1    Feb. 18, 2010

(51) Int. Cl.
*B23B 45/00* (2006.01)
*B23B 19/00* (2006.01)

(52) U.S. Cl. .......................... 173/1; 173/170
(58) Field of Classification Search ............ 173/1, 173/170; 30/276, 392
See application file for complete search history.

(56) References Cited

U.S. PATENT DOCUMENTS

| | | | |
|---|---|---|---|
| 3,640,635 A * | 2/1972 | Von Hollen | 408/101 |
| 3,939,924 A * | 2/1976 | Grabovac | 173/216 |
| 4,015,668 A | 4/1977 | Wilson | |
| 4,286,675 A * | 9/1981 | Tuggle | 173/213 |
| 4,286,699 A * | 9/1981 | Pawelka | 477/209 |
| 4,300,336 A | 11/1981 | Miyata | |
| 4,397,369 A | 8/1983 | Read | |
| 4,733,471 A * | 3/1988 | Rahe | 30/276 |
| 4,780,992 A * | 11/1988 | McKervey | 451/354 |
| 4,832,131 A * | 5/1989 | Powell et al. | 172/25 |
| 4,953,294 A | 9/1990 | Dohse | |
| 5,013,282 A | 5/1991 | Keller | |
| 5,175,932 A | 1/1993 | Lange et al. | |
| 5,251,706 A * | 10/1993 | Evans | 173/29 |
| 5,351,403 A | 10/1994 | Becker et al. | |
| 5,636,444 A | 6/1997 | Nickel | |
| 5,697,453 A * | 12/1997 | Van Den Bosch | 172/41 |
| 5,746,193 A | 5/1998 | Swan | |
| 5,926,961 A * | 7/1999 | Uhl | 30/296.1 |
| 6,182,367 B1 | 2/2001 | Janczak | |
| 6,464,031 B1 * | 10/2002 | Cobb | 180/230 |
| 6,722,041 B2 * | 4/2004 | Warashina et al. | 30/276 |
| 6,742,266 B2 * | 6/2004 | Splane, Jr. | 30/392 |
| 6,901,666 B2 * | 6/2005 | Warashina et al. | 30/276 |
| 6,978,694 B2 * | 12/2005 | Peppard | 74/489 |
| 2004/0148783 A1 * | 8/2004 | Cashman et al. | 30/276 |
| 2005/0028382 A1 * | 2/2005 | Nakadate et al. | 30/276 |
| 2005/0198835 A1 * | 9/2005 | Warashina et al. | 30/276 |
| 2007/0204887 A1 * | 9/2007 | Wood | 134/115 G |
| 2008/0141541 A1 * | 6/2008 | Hurley | 30/276 |

* cited by examiner

*Primary Examiner*—Brian D Nash
(74) *Attorney, Agent, or Firm*—Wood, Phillips, Katz, Clark & Mortimer

(57) ABSTRACT

A portable powered tool having an elongate housing with a central axis, a working component on the elongate housing, a drive for the working component on the elongate housing and having different states, and a control with a grip that is configured to be grasped by a user by extending a user's one hand at least partially around the grip and thereby the central axis of the elongate housing to thereby situate the user's one hand in an operating position. The user's one hand, grasping the grip in the operating position, is usable to: a) support and reposition the portable powered tool; and b) move the grip around the central axis of the elongate housing to change the state of the drive.

21 Claims, 4 Drawing Sheets

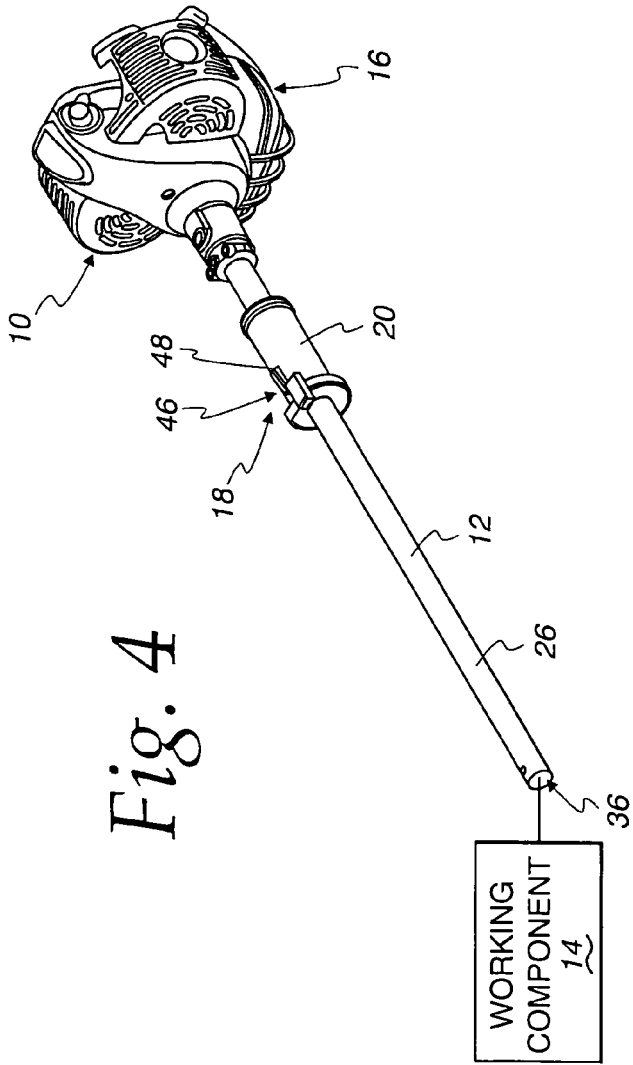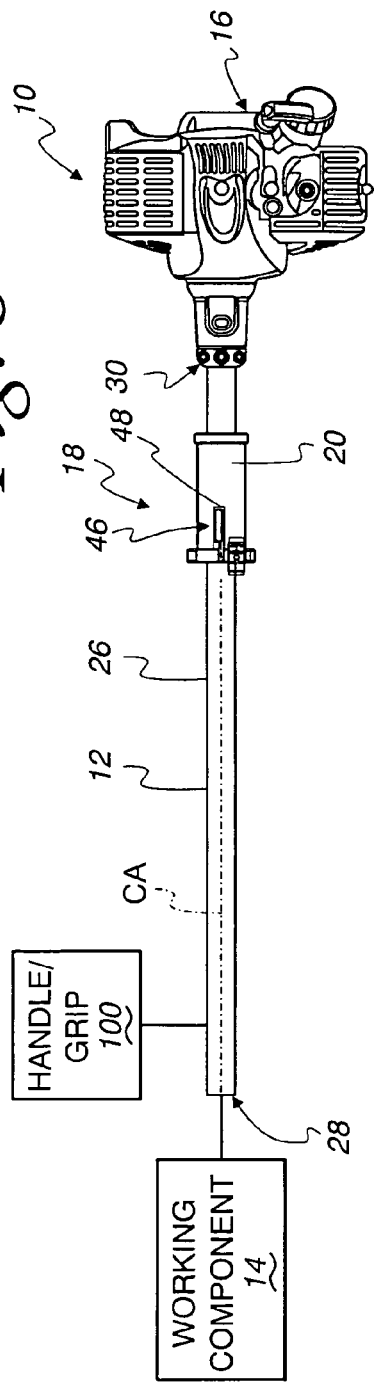

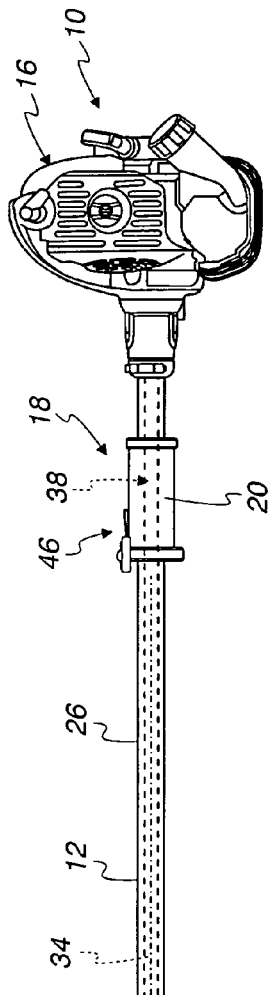
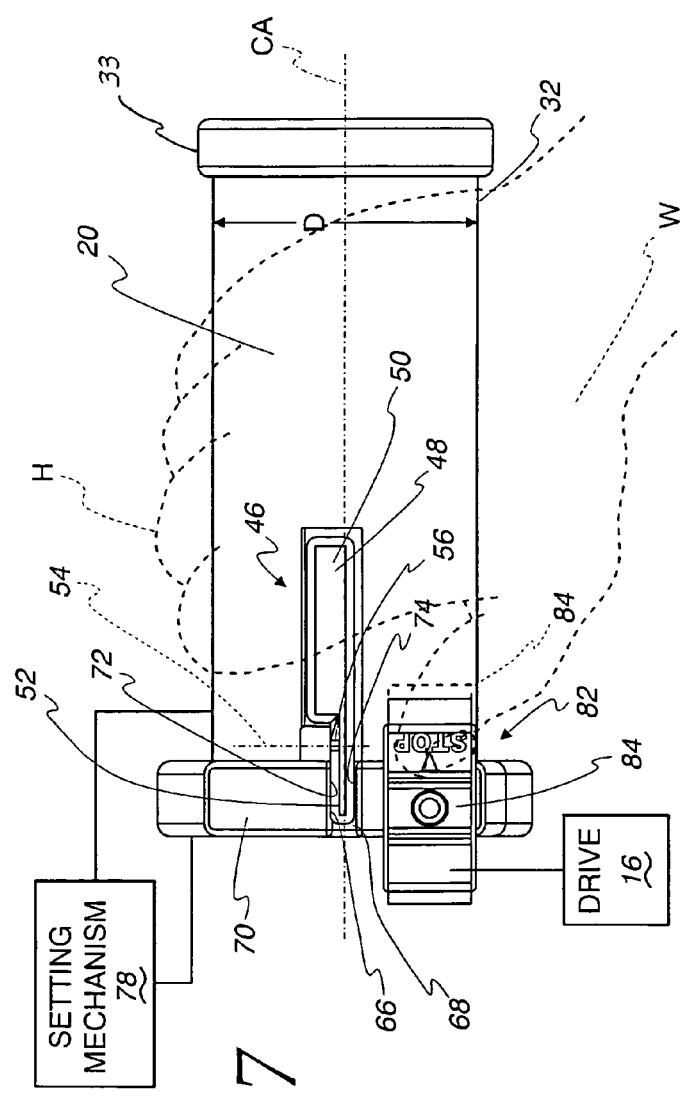

PORTABLE TOOL WITH A HAND-GRIPPED CONTROLLER AND METHOD OF USING A PORTABLE POWERED TOOL

BACKGROUND OF THE INVENTION

1. Field of the Invention

This invention relates to portable, powered tools and, more particularly, to a tool having an elongate housing that is engageable and repositionable by a user to controllably situate a working component at an end of the housing.

2. Background Art

There is a multitude of portable, powered tools that are built around an elongate housing through which a user can extend the reach of a working component at an end of the housing. This tool design is common in the landscaping industry, for which tools are offered with many different capabilities. For example, the working component may incorporate a rotary, flexible trimmer line, an endlessly moving cutting chain, a reciprocating brush cutting blade(s), etc.

The elongate housing may be made with a fixed length or a variable length, with the latter commonly achieved through a telescoping connection of housing parts. With the tool incorporating a rotary flexible trimmer line, the user is allowed, through this construction, to stand upright upon a subjacent surface and comfortably cut and trim grass at that surface.

With the tool incorporating a moving cutting chain, the elongate housing permits an extended reach of the working component/chain on the tool, as to cut limbs at a relatively significant height without requiring the use of lifts or ladders. The same advantages are afforded by this design in the event that the working component incorporates one or more moving/reciprocating cutting blades, or other types of mechanism commonly used to trim bushes and cut other vegetation.

To facilitate safe and controlled operation with these tools, it is important that a user be able to positively lift and support the tool as well as reposition it to strategically place the working component precisely at different locations where an operation is to be performed.

It is also important that the tools be supportable by a user in operation in a manner whereby the user is not awkwardly positioned and does not suffer fatigue after extended use periods.

With all of the different tool designs, it is also critical that, in addition to supporting the tool in use, the user be able to conveniently control the speed of a drive for the tool.

One exemplary tool structure built upon an elongate housing is shown in U.S. Pat. No. 4,953,294, to Hans-Peter Dohse. In this design, a handle assembly branches away from an elongate housing and defines separate grips that can be grasped, one each, in the separate hands of a user. One of the grips is designed to double as a throttle control. The grip is turned around an axis to vary the speed of the associated drive.

This tool has a significant moment arm between the grips and the lengthwise center of gravity for the tool. Thus, after extended use, the user may be prone to fatiguing.

Also, by reason of offsetting and spacing the grips, the user is required to support and manipulate the tool with the arms extended somewhat awkwardly. This also may lead to fatigue and may additionally diminish the degree of control that the user has as he/she attempts to precisely place the working component of the tool during an operation.

Further, this tool suffers from the limitation that it is designed to be held by a user in essentially one orientation. Field conditions may require that a user awkwardly change the orientation from that for which it is designed.

For more positive control, tools built around elongate housings have been made with grips thereon that are surrounded by one or both hands of a user. An example of this design is shown in U.S. Pat. No. 6,182,367, to Jerzy Janczek. With one of the user's hands firmly surrounding the lengthwise housing axis, and the other hand grasping a spaced handle, the tool may be positively supported and repositioned.

With this design, one grip has, adjacent thereto, a throttle trigger that is repositioned by a pivoting movement through one or more fingers on the user's one gripping hand. The trigger of this type operates typically through a cable that shifts in response to the trigger movement.

This design also contemplates that the user will grasp the tool for operation primarily in one specific orientation. If the orientation of the working component is required to be changed, the user may be left with the options of gripping the tool in a manner not intended by its design, or awkwardly repositioning his/her body to place the working component in the desired operating orientation. In the former case, the ability to comfortably support the tool and at the same time properly operate the throttle may be compromised. This could lead to user fatigue and, potentially to an injury, if appropriate safeguards are not taken.

The industry continues to seek out designs for such tools that are safely and comfortably operable, and that afford versatility in terms of how they can be controllably repositioned in use.

SUMMARY OF THE INVENTION

The invention is directed to a portable powered tool having an elongate housing with a central axis, a working component on the elongate housing, a drive for the working component on the elongate housing and having different states, and a control with a grip. The grip is configured to be grasped by a user by extending the user's one hand at least partially around the grip and thereby the central axis of the elongate housing to thereby situate the user's one hand in an operating position. The user's one hand, grasping the grip in the operating position, is usable to: (a) support and reposition the portable powered tool; and (b) move the grip around the central axis of the elongate housing to change the state of the drive.

In one form, the elongate housing has at least a first portion over which the elongate housing extends in a substantially straight line and the grip is provided on the first portion of the elongate housing.

In one form, there is a drive shaft that transmits an operating force from the drive to the working component. The drive shaft extends through the housing so that a user's hand in the operating position extends around a portion of the drive shaft.

In one form, the working component is one of: a) a flexible line trimmer; b) an endless cutting chain; and c) a trimmer with at least one movable/reciprocating cutting blade.

In one form, the grip resides between the drive and the working component.

In one form, the drive and working component are integrated as a unit that is attached to the elongate housing.

In one form, the elongate housing is in the form of a tubular element.

In one form, the control is a throttle control and the different states for the drive are different operating speeds selected by moving the grip around the central axis of the elongate housing.

In one form, the grip has a cylindrical member that extends continuously around the central axis of the elongate housing.

In one form, the portable powered tool further has a lockout mechanism with: (a) a first state in which the grip can be moved around the central axis of the elongate housing to change the state of the drive; and (b) a second state in which the grip is prevented from being moved around the central axis of the elongate housing to change the state of the drive. The lockout member has a switch that is movable between first and second positions, thereby to change the lockout mechanism from the second state into the first state. The switch is positioned relative to the grip to be movable between the first and second positions by one or more fingers on a user's one hand in the operating position.

In one form, the portable powered tool further has a mechanism through which the grip can be controllably, releasably maintained in different angular positions with respect to the central axis of the elongate housing.

In one form, the drive is operated by one of: a) a combustible fuel; b) a battery; and c) electrical current from a separately generated supply.

In one form, the portable powered tool further has an on/off switch for the drive. The on/off switch is operable by a component that is repositionable by at least one finger on a user's one hand in the operating position.

In one form, the elongate housing is substantially straight fully between first and second ends. The drive is provided at the first end of the elongate housing and the working component is provided at the second end of the elongate housing.

In one form, the control has a cable with an elongate core element that is shifted lengthwise in response to movement of the grip around the central axis of the elongate housing.

In one form, the elongate housing has a tubular element defining the central axis and there is a drive shaft that extends within the tubular element and couples the drive and working component.

The invention is further directed to a method of operating a portable powered tool including the steps of: a) providing a portable powered tool having: (i) an elongate housing defining a central axis for the portable powered tool; (ii) a working component on the elongate housing; (iii) a drive for the working component on the elongate housing and having different states; and (iv) a control with a grip; b) grasping the grip with one hand extended at least partially around the grip and the central axis to thereby place the one hand in an operating position; c) with the one hand in the operating position, supporting through the one hand at least a portion of the weight of the portable powered tool and exerting a repositioning force to thereby controllably place the working component at a desired working location; and d) with the one hand in the operating position, moving the grip with the one hand around the central axis to change the state of the drive.

In one form, the different states are different operating speeds.

In one form, the portable powered tool has an on/off switch for the drive and the method further includes the step of changing the on/off switch between on and off states through at least one finger on the user's one hand with the user's one hand in the operating position.

In one form, the step of providing a portable powered tool involves providing a portable powered tool with a working component that is one of: a) a flexible line trimmer; b) an endless cutting chain; and c) a trimmer with at least one moving/reciprocating cutting blade.

BRIEF DESCRIPTION OF THE DRAWINGS

FIG. 4 is a partially schematic, perspective view of one specific form of portable powered tool, as shown in FIG. 1;

FIG. 5 is a plan view of the portable powered tool in FIG. 4;

FIG. 6 is a side elevation view of the portable powered tool in FIGS. 4 and 5;

FIG. 7 is an enlarged, partially schematic, plan view of a throttle control on the portable powered tool in FIGS. 4-6;

DETAILED DESCRIPTION OF THE PREFERRED EMBODIMENT

Figure 1:
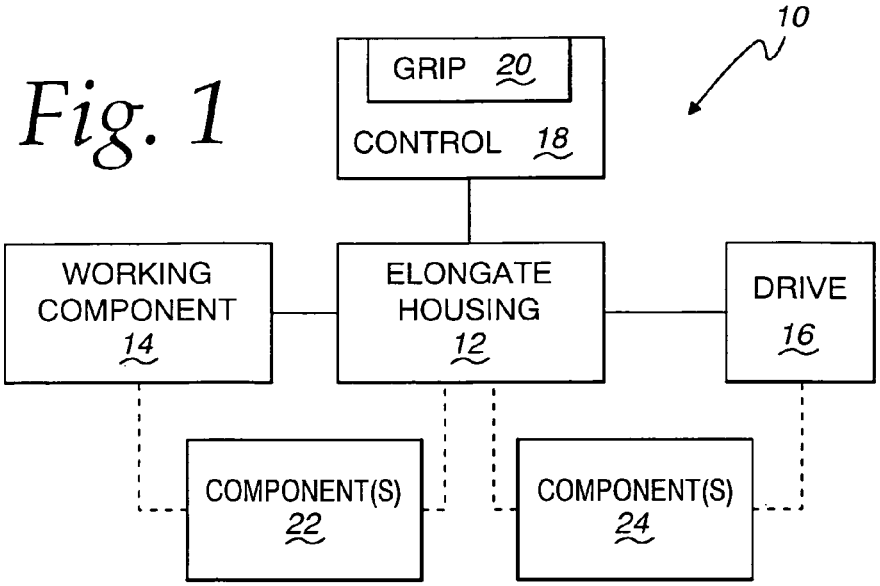
FIG. 1 is schematic representation of one form of a portable powered tool, according to the present invention.

A portable, powered tool, according to the invention, is shown schematically at 10 in FIG. 1. The powered tool 10 has an elongate housing 12 with a central axis. A working component 14 is provided on the elongate housing 12. A drive 16 for the working component 14 is additionally provided on the elongate housing 12 and has different states. A control 18 is also provided on the elongate housing 12 and has a grip 20 that is configured to be grasped by a user by extending one hand of the user at least partially around the grip 20, and thereby the central axis of the elongate housing 12, to thereby situate the user's one hand in an operating position. The user's one hand grasping the grip 20 in the operating position is usable to: (a) lift, support and reposition the portable powered tool 10; and (b) move the grip 20 around the central axis of the elongate housing 12 to change the state of the drive 16.

The components are shown in schematic form in FIG. 1 since virtually a limitless number of different variations of each such component is contemplated by the invention. For example, the working component 14 may be any type of device that performs an operation on an object against which it is placed. As examples, the working component may be one that incorporates: a) a rotary, flexible trimmer line, as shown in U.S. Pat. No. 4,300,336; b) an endless cutting chain, as shown in U.S. Pat. No. 5,013,282; and c) a trimmer with at least one moving/reciprocating cutting blade, as shown in U.S. Patent Publication No. US 2007/0169599A1. The disclosure in each of these patent documents is incorporated herein by reference.

The drive 16 may be operated by one of: a) a combustible fuel; b) a battery; and c) electrical current from a separately generated supply, such as a household supply that may be connected as through a power cord.

The elongate housing 12 may be straight over a portion, or the entirety, of its extent between the working component 14 and drive 16. The elongate housing 12 may be connected directly to the working component 14 and drive 16 or, as shown in dotted lines, at least one intermediate component 22, 24 may be provided respectively between: the elongate housing 12 and working component 14; and/or the elongate housing 12 and drive 16.

Generally, the elongate housing 12 will define a central axis for the tool 10 that extends through the center of gravity for the tool with the length of the elongate housing 12 generally vertically oriented.

Figure 2:
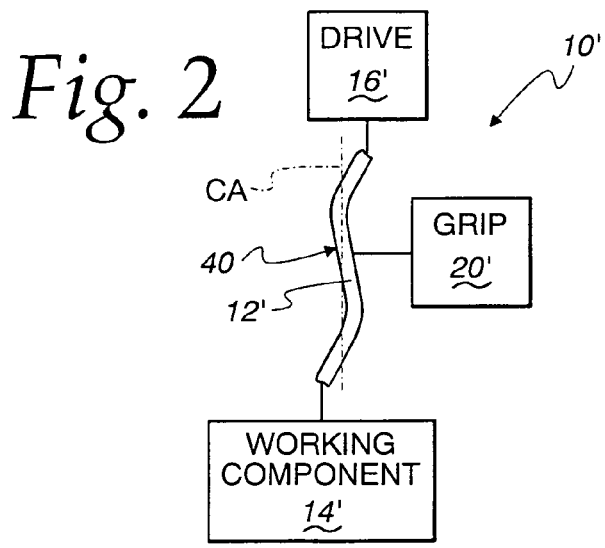
FIG. 2 is a schematic representation of another form of portable powered tool, according to the present invention.

The significance of the location of the grip relative to the vertical center of gravity is explained with respect to the tool 10' in FIG. 2. In FIG. 2, an elongate housing 12' is shown with a non-straight shape and a drive 16' and working component 14' mounted thereto. With the length of the elongate housing generally vertically oriented, the central axis CA of the tool 10' is oriented so that with a grip 20' on the elongate housing 12' at or near the central axis CA, the user's one hand in the operative position can stably grasp the grip 20' without there being any substantial weight forces tending to skew the tool 10' from the vertical orientation.

The control 18 may be operable to change any state of the drive 16, such as its speed. The control 18 is not, however, limited to operation for speed variation.

Figure 3:
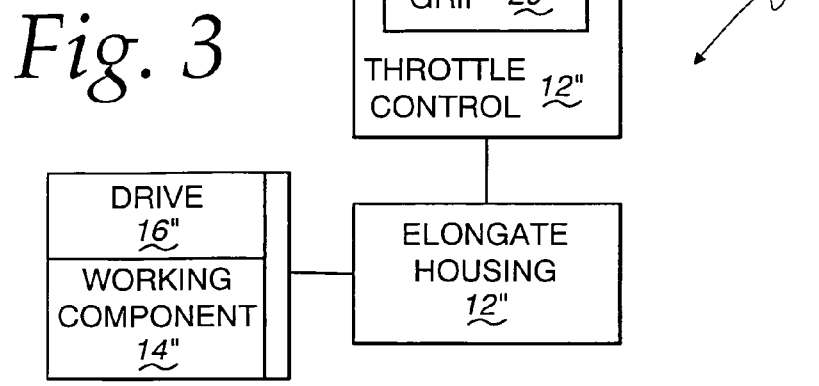
FIG. 3 is a schematic representation of a still further modified form of portable powered tool, according to the invention.

As seen in FIG. 3, the invention also contemplates that a drive 16" and working component 14" may be integrated as a unit that is attached to an elongate housing 12". On the tool 10" shown in FIG. 3, a throttle control 12", with an associated grip 20", can be incorporated in the same manner as the corresponding elements on the elongate housing 12 on the tool 10.

In FIGS. 4-10, one specific form of the portable, powered tool, shown at 10 in FIG. 1, is depicted. The elongate housing 12 is shown as a hollow tubular element 26, extending around, and defining a central axis CA common to both the tubular element 26 and the entire tool 10.

The elongate housing 12 has axially spaced ends 28,30. The working component 14 is provided at the axial end 28, with the drive 16 for the working component 14 provided at the opposite end 30.

The control 18 is a throttle control located axially between the housing ends 28, 30. The grip 20 on the throttle control 18, in this embodiment, is configured as a continuous cylindrical member with a diameter D that can be comfortably grasped by the user's one hand H, with the one hand H in the aforementioned operating position. In the operating position, the user's one hand H may be extended partially, or fully, around the grip 20 and thus the central axis CA, that is preferably concentric with the central axis of the cylindrically-shaped outer surface 32 of the grip 20, but may be slightly offset therefrom in a generally parallel relationship. The diameter D is selected so that the user's one hand H in the operating position can be comfortably moved to lift and support the tool 10 in an elevated position and reposition the tool 10 during operation and, while so doing, move the grip 20 around the central axis CA to thereby change the state of the drive 16. A radially enlarged rim 33 is provided at the axial end of the grip 20. This rim 33 may move with the grip surface 32 around the axis CA, or may be fixed, to function as a rest for the user's hand.

With this arrangement, by rolling the wrist region W on the user's one hand H in the operative position, the user can angularly reorient the working component 14 around the central axis CA to facilitate the performance of operations with the working component 14 comfortably maintained in different orientations. At the same time, the user maintains the ability to conveniently change the state of the drive 16, and for this embodiment, the operating speed. In many operations, such as those using flexible line trimmers, endless cutting chains, moving reciprocating cutting blades, etc., it is desirable, for purposes of economy and optimal performance, to be able to regularly vary the speed of operation of the drive 16.

The precise manner in which an operating force is transmitted from the drive 16 to the working component 14 is not critical to the present invention. In the depicted form, a drive shaft 34 extends within and through a passageway 36 bounded by the tubular element 26 to engage each of the working component 14 and drive 16. The drive shaft 34 may be made from a flexible element, a rigid element, or a combination thereof. The drive shaft 34 may be made from a single element or multiple cooperating elements. With this arrangement, the user's hand H, in the operating position therefor, extends around a portion of the drive shaft at 38.

As previously noted, while the housing 12 is shown to be straight along its entire axial extent, this is not a requirement. For example, as shown in FIG. 2, the elongate housing 12' may be non-straight with virtually any shape. Preferably at least a portion of the housing 12, as shown in FIG. 2 at 40, is straight in the region where the grip 20' is located.

Additionally, while the grip 18 is located between the drive 16 and working component 14, it conceivably could be incorporated into one of these components. Alternatively, the grip 20 could be located at one of the housing ends 28,30, as opposed to an intermediate location therealong, as depicted.

In this embodiment, a lockout mechanism 46 is also provided. The lockout mechanism 46 has a first state, in which the grip 20 can be moved around the central axis CA to change the state of the drive 16. The lockout mechanism 46 has a second state, in which the grip 20 is prevented from being moved around the central axis CA to change the state of the drive 16.

Figure 8:
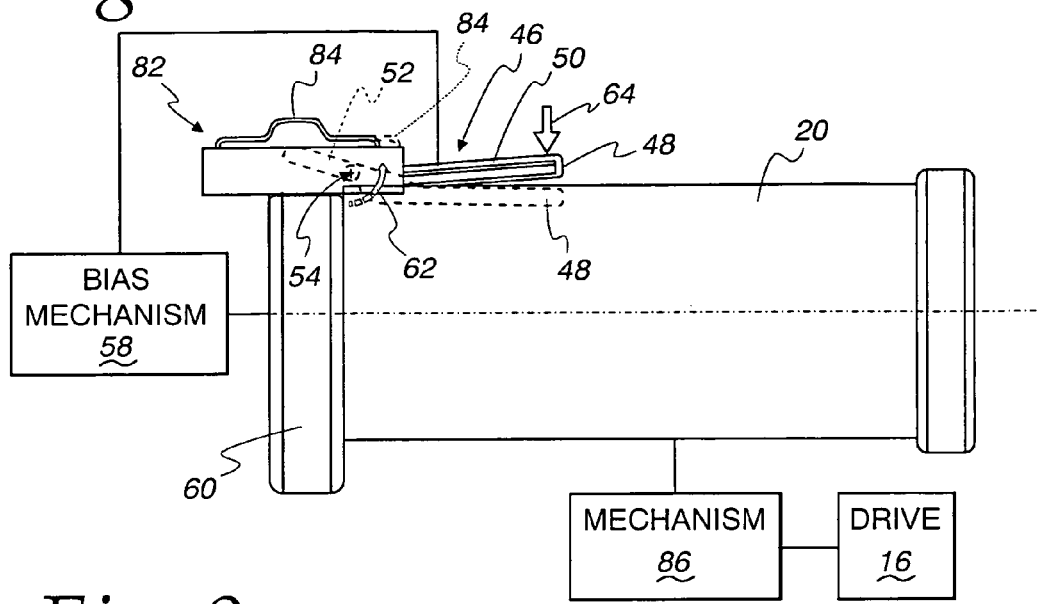
FIG. 8 is a side elevation view of the throttle control shown in FIG. 7.

The lockout mechanism 46 includes a switch 48 that is movable, through a pivoting action, between a first position, shown in dotted lines in FIG. 8, in which the lockout mechanism 46 is in the first state, and a second position, as shown in solid lines in each of FIGS. 7 and 8, in which the lockout mechanism 46 is in the second state.

The switch 48 consists of an actuating arm 50 and a blocking arm 52 on opposite sides of a pivot axis 54 defined by a mounting pin 56 for the switch 48. Through a bias mechanism 58, acting between the switch 48 and a mounting component 60 on the lockout mechanism 46, the switch 48 is normally biased in the direction of the arrow 62 around the axis 54 to the second position therefor.

By exerting a radial inward force on the actuating arm 50 in the direction of the arrow 64 in FIG. 8, the user can change the switch 48 from its second position into its first position. As this occurs, the locking arm 52 moves out of a seat 66 defined by an undercut 68 through a flat surface 70 on the mounting component 60. With the locking arm 52 within the seat 66, circumferentially facing surfaces 72,74 intercept the blocking arm 52 as it is moved in opposite directions around the central axis CA. With the switch 48 in its first position, the locking arm 52 moves out of the seat 66 so as not to be in radial coincidence with the surfaces 72, 74, whereby the grip 20 is allowed to be moved around the central axis CA to change the state of the drive 16.

The switch 48 can be repositioned with the user's one hand H in the operating position. This repositioning may be effected by one or more fingers on that hand or by the web region between the index finger and thumb which, for purposes of clarity herein, will be considered to be part of the user's fingers.

As depicted schematically in FIG. 7, the invention also contemplates that a setting mechanism 78 may be incorporated. The setting mechanism 78 cooperates between the grip 20 and mounting component 60, or another part on the elongate housing 12. Through this mechanism, the grip 20 can be controllably releasably maintained in different angular positions with respect to the central axis CA, thereby allowing different states for the drive 16 to be set and releasably maintained. The design of this setting mechanism 78 is not critical to the present invention and a multitude of different structures may be devised to function as explained above by one skilled in the art.

As seen most clearly in FIGS. 7 and 8, an on/off switch for the drive 16 is provided at 82. The on/off switch 82 consists of a component 84 that is translatingly repositionable by at least one finger on the user's one hand H, in the operating position, to thereby change the state of the drive 16. The component 84 is shifted axially between the solid line position in FIGS. 7 and 8 and the dotted line position in those same Figures to thereby disable the drive 16 by turning the same "off".

Figure 9:
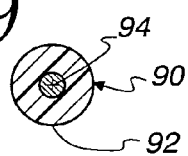
FIG. 9 is a cross-sectional view of a cable through which the throttle control in FIGS. 7 and 8 is operated.

The throttle control 18 may use any type of mechanism acting between the grip 20 and drive 16 to effect the change of state. This mechanism is shown schematically at 86 in FIG. 8. As shown in FIG. 9, the mechanism 86 may incorporate a cable, such as a Bowden cable 90, having a sheath 92 in which a slidable, elongate core 94 is provided. Movement of the grip 20 around the axis CA causes the core 94 to shift lengthwise and thereby to move a component, such as an arm on a carburetor, as would be on the drive 16, shown in FIGS. 4-6 as an internal combustion engine.

Depending upon the configuration of the tool, additional support for a user's second hand may be desirable or required to lift and reorient the tool. An exemplary handle/grip is shown schematically at 100 in FIG. 5 for this purpose on the elongate housing 12, at a location spaced from the grip 20.

Figure 10:
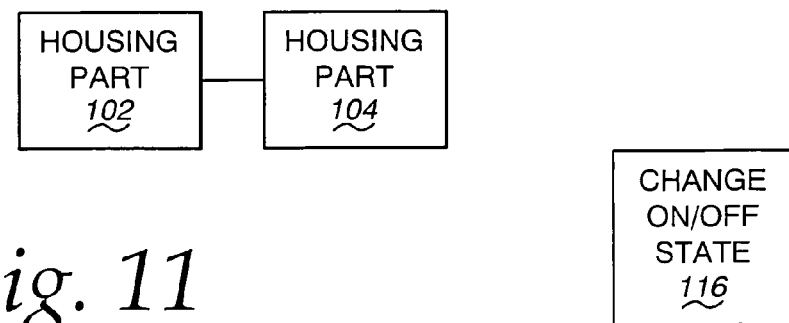
FIG. 10 is a schematic representation of a variable length elongate housing for the inventive portable, powered tool.

As shown in FIG. 10, an elongate housing 12''', made according to the invention, may be length variable. This is accomplished by having cooperating parts 102,104 that may be telescopingly, foldably, or otherwise, engaged.

The grip 20 can be made from any material that permits the grip 20 to be comfortably grasped by a user. The grip material may be cushioned and/or knurled/contoured for positive grasping.

Figure 11:
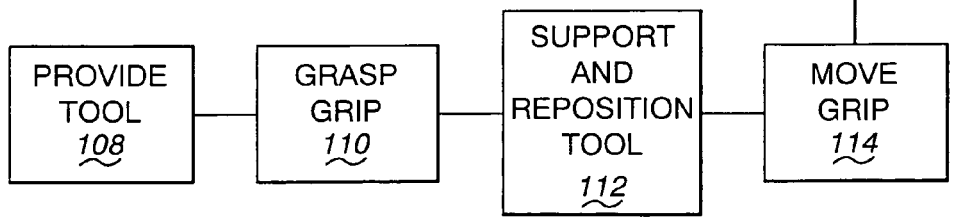
FIG. 11 is a flow diagram representation of a method of operating a portable, powered tool according to the invention.

The invention is further directed to a method of operating a portable power tool, as shown in flow diagram form in FIG. 11. As shown at block 108, a portable, powered tool is provided having: a) an elongate housing defining a central axis for the portable powered tool; b) a working component on the elongate housing; c) a drive for the working component, having different states, on the elongate housing; and d) a control with a grip.

As shown at block 110, the grip on the tool is grasped with one hand extending at least partially around the grip and the central axis to thereby place the one hand in the operating position.

As shown at block 112, with the one hand in the operating position, the user: a) supports through the one hand at least a portion of the weight of the portable, powered tool; and b) exerts a repositioning force to thereby controllably place the working component at a desired working location.

As shown at block 114, with the user's hand in the operating position, the grip is moved around the central axis to change the state of the drive.

The method optionally includes the step, as shown at block 116, of changing an on/off switch between on and off states through at least one finger on the user's one hand H, with the user's one hand H in the operating position.

The foregoing disclosure of specific embodiments is intended to be illustrative of the broad concepts comprehended by the invention.

The invention claimed is:

1. A portable powered tool comprising:
an elongate housing having a central axis;
a working component on the elongate housing;
a drive for the working component on the elongate housing and having different states; and
a control comprising a grip that is configured to be grasped by a user by extending a user's one hand at least partially around the grip and thereby the central axis of the elongate housing to thereby situate the user's one hand in an operating position,
the grip movable around the central axis and operatively associated with the drive to thereby cause the drive to change between different states as the grip is moved relative to the housing around the central axis,
a user's one hand grasping the grip in the operating position usable to: (a) lift, support and reposition the portable powered tool; and (b) move the grip relative to the elongate housing around the central axis of the elongate housing,
whereby movement of the grip relative to the housing around the central axis of the elongate housing causes the state of the drive to be changed.

2. The portable powered tool according to claim 1 wherein the elongate housing has at least a first portion over which the elongate housing extends in a substantially straight line and the grip is provided at the first portion of the elongate housing.

3. The portable powered tool according to claim 1 wherein there is a drive shaft that transmits an operating force from the drive to the working component and the drive shaft extends through the housing so that a user's hand grasping the grip in the operating position extends around a portion of the drive shaft.

4. The portable powered tool according to claim 1 wherein the working component comprises one of: a) a flexible line trimmer; b) an endless cutting chain; and c) a trimmer with at least one movable/reciprocating cutting blade.

5. The portable powered tool according to claim 1 wherein the grip resides between the drive and the working component.

6. The portable powered tool according to claim 1 wherein the drive and working component are integrated as a unit that is attached to the elongate housing.

7. The portable powered tool according to claim 1 wherein the elongate housing comprises a tubular element extending between the drive and the working component and the grip resides between the drive and the working component.

8. The portable powered tool according to claim 1 wherein the control is a throttle control and the different states for the drive are different operating speeds selected by moving the grip around the central axis of the elongate housing.

9. The portable powered tool according to claim 1 wherein the grip comprises a cylindrical member that extends continuously around the central axis of the elongate housing.

10. The portable powered tool according to claim 1 wherein the portable powered tool further comprises a mechanism through which the grip can be controllably, releasably maintained in different angular positions with respect to the central axis of the elongate housing.

11. The portable powered tool according to claim 1 wherein the drive is operated by one of: a) a combustible fuel; b) a battery; and c) electrical current from a separately generated supply.

12. The portable powered tool according to claim 1 wherein the portable powered tool further comprises an on/off switch for the drive, the on/off switch operable by a component that is repositionable by at least one finger on a user's one hand in the operating position.

13. The portable powered tool according to claim 1 wherein the elongate housing is substantially straight fully between first and second ends, the drive is provided at the first end of the elongate housing and the working component is provided at the second end of the elongate housing between the drive and working component.

14. The portable powered tool according to claim 13 wherein the elongate housing comprises a tubular element defining the central axis and there is a drive shaft that extends within the tubular element and couples the drive and working component.

15. The portable powered tool according to claim 1 wherein the control comprises a cable with an elongate core element with a length that is shifted lengthwise in response to movement of the grip around the central axis of the elongate housing.

16. A portable powered tool comprising:
an elongate housing having a central axis;
a working component on the elongate housing;
a drive for the working component on the elongate housing and having different states; and
a control comprising a grip that is configured to be grasped by a user by extending a user's one hand at least partially around the grip and thereby the central axis of the elongate housing to thereby situate the user's one hand in an operating position,
the grip movable around the central axis and operatively associated with the drive to thereby cause the drive to change between different states as the rip is moved around the central axis,
a user's one hand grasping the grip in the operating position usable to: (a) lift, support and reposition the portable powered tool; and (b) move the grip around the central axis of the elongate housing to change the state of the drive,
wherein the portable powered tool further comprises a lockout mechanism having: a) a first state in which the grip can be moved around the central axis of the elongate housing to change the state of the drive; and b) a second state in which the grip is prevented from being moved around the central axis of the elongate housing to change the state of the drive, the lockout mechanism comprising a switch that is movable between first and second positions thereby to change the lockout mechanism from the second state into the first state, and the switch is positioned relative to the grip to be movable between the first and second positions by one or more fingers on a user's one hand in the operating position.

17. A method of operating a portable powered tool, the method comprising the steps of:
providing a portable powered tool comprising: a) an elongate housing defining a central axis for the portable powered tool; b) a working component on the elongate housing; c) a drive for the working component on the elongate housing and having different states; and (d) a control with a grip;
grasping the grip with one hand of a user extended at least partially around the grip and the central axis between the drive and working component to thereby place the one hand in an operating position,
with the one hand in the operating position: (i) supporting through the one hand at least a portion of a weight of the portable powered tool with the portable powered tool lifted by the user; and (ii) exerting a repositioning force to thereby controllably place the working component at a desired working location with the portable powered tool supported in a lifted position by the user; and
with the one hand in the operating position moving the grip relative to the elongate housing around the central axis,
whereby the movement of the grip relative to the housing around the central axis of the elongate housing causes the state of the drive to be changed.

18. The method of operating a portable powered tool according to claim 17 wherein the different states comprise different operating speeds.

19. The method of operating a portable powered tool according to claim 17 wherein the portable powered tool comprises an on/off switch for the drive and further comprising the step of changing the on/off switch between on and off states through at least one finger on the user's one hand with the user's one hand in the operating position.

20. The method of operating a portable powered tool according to claim 17 wherein the step of providing a portable powered tool comprises providing a portable powered tool with a working component that is one of: a) a flexible line trimmer; b) an endless cutting chain; and c) a trimmer with at least one moving/reciprocating cutting blade.

21. A portable powered tool comprising:
an elongate housing having a central axis;
a working component on the elongate housing;
a drive for the working component on the elongate housing and having different states; and
a control comprising a grip that is configured to be grasped by a user by extending a user's one hand at least partially around the grip and thereby the central axis of the elongate housing to thereby situate the user's one hand in an operating position,
a user's one hand grasping the grip in the operating position usable to: (a) lift, support and reposition the portable powered tool; and (b) move the grip relative to the elongate housing around the central axis of the elongate housing,
wherein the control is a throttle control and the different states for the drive are different operating speeds selected by moving the grip relative to the elongate housing around the central axis of the elongate housing,
the portable powered tool further comprising a mechanism through which the grip can be controllably, releasably maintained in different angular positions with respect to the central axis of the elongate housing.

* * * * *